United States Patent [19]
Rohrbeck

[11] Patent Number: 6,044,866
[45] Date of Patent: Apr. 4, 2000

[54] GAS FLOW VALVE

[75] Inventor: Heribert Rohrbeck, Schwäbisch Hall, Germany

[73] Assignee: Burkert Werke GmbH & Co., Germany

[21] Appl. No.: 08/839,809

[22] Filed: Apr. 18, 1997

[30] Foreign Application Priority Data

Apr. 23, 1996 [DE] Germany ............... 296 07 363 U

[51] Int. Cl.[7] .................................................. F16R 31/06
[52] U.S. Cl. ...................... 137/807; 137/827; 137/251.1; 137/909
[58] Field of Search .................... 137/807, 827, 137/251.1, 253, 909

[56] References Cited

U.S. PATENT DOCUMENTS

| | | | |
|---|---|---|---|
| 2,670,749 | 3/1954 | Germer | 137/909 X |
| 3,010,471 | 11/1961 | Gross | 137/909 X |
| 3,406,704 | 10/1968 | Van Fossen | 137/251.1 |
| 3,417,771 | 12/1968 | Ernst | 137/807 |
| 3,448,751 | 6/1969 | Rosaen | 137/807 |
| 3,701,357 | 10/1972 | Granstrom et al. | 137/827 |
| 3,970,112 | 7/1976 | Bernard | 137/807 |
| 3,982,722 | 9/1976 | Bernard | 251/4 |
| 4,463,502 | 8/1984 | Fitzgerald et al. | 137/909 X |
| 5,032,308 | 7/1991 | Knobel et al. | 252/74 |
| 5,075,021 | 12/1991 | Carlson et al. | 252/73 |
| 5,113,890 | 5/1992 | Elizondo-Gonzalez et al. | 137/909 X |
| 5,190,073 | 3/1993 | Vogt | 137/807 X |
| 5,362,027 | 11/1994 | Champaigne et al. | 137/909 X |

FOREIGN PATENT DOCUMENTS

| | | |
|---|---|---|
| 2758072 | 7/1979 | Germany . |
| 0000672 | 1/1983 | Japan ............... 137/909 |

*Primary Examiner*—John Rivell
*Attorney, Agent, or Firm*—Nixon Peabody LLP; Stuart J. Friedman

[57] ABSTRACT

A gas flow valve comprises at least one gas inlet, at least one gas outlet, a flow path between said gas inlet and said gas outlet, a magnetic fluid in the valve arranged in the flow path and means for application of a magnetic field to the magnetic fluid. The magnetic fluid solidifies upon application of the magnetic field, interrupts the flow path from at least one gas inlet to at least one gas outlet gas-tight and permits gas flow when no magnetic field is applied.

35 Claims, 11 Drawing Sheets

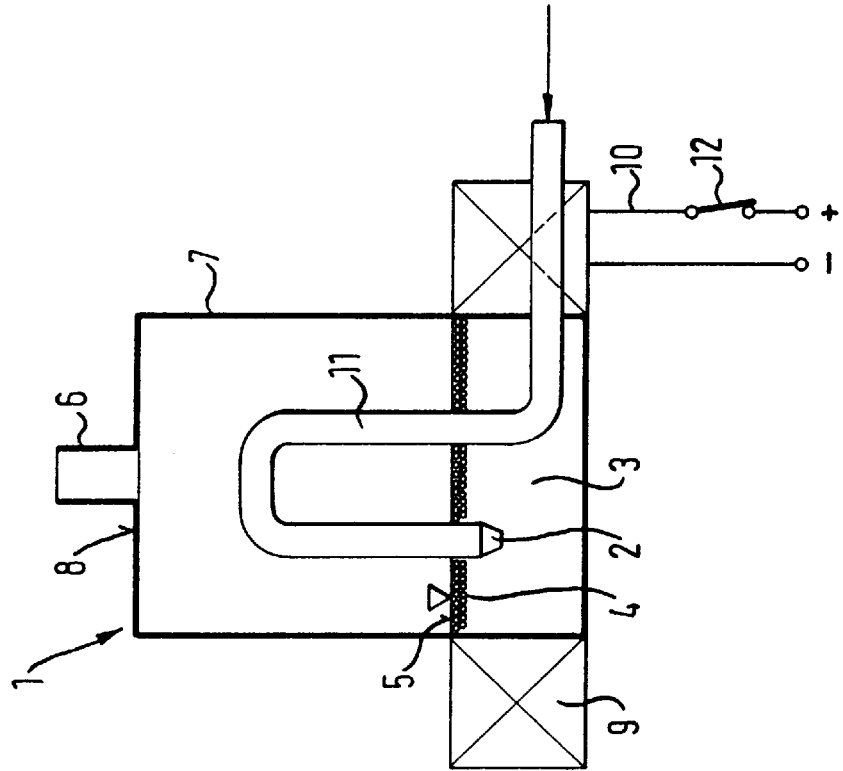
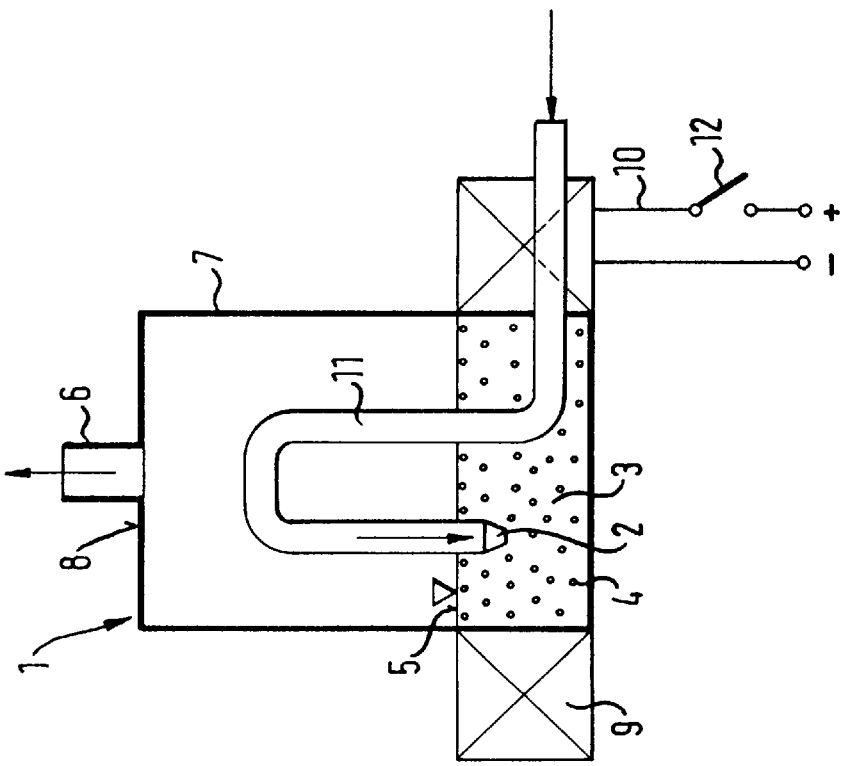

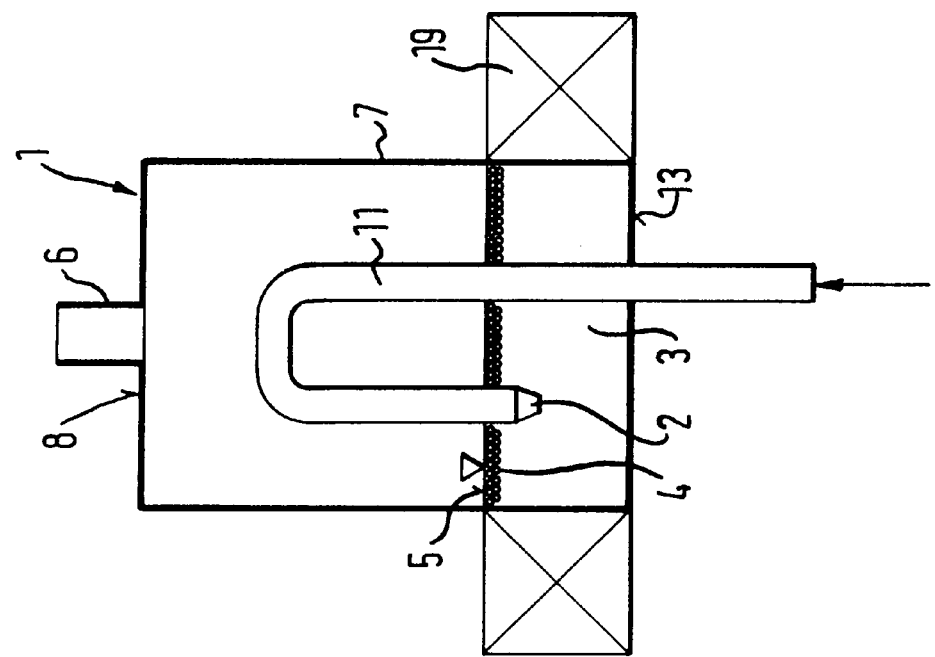
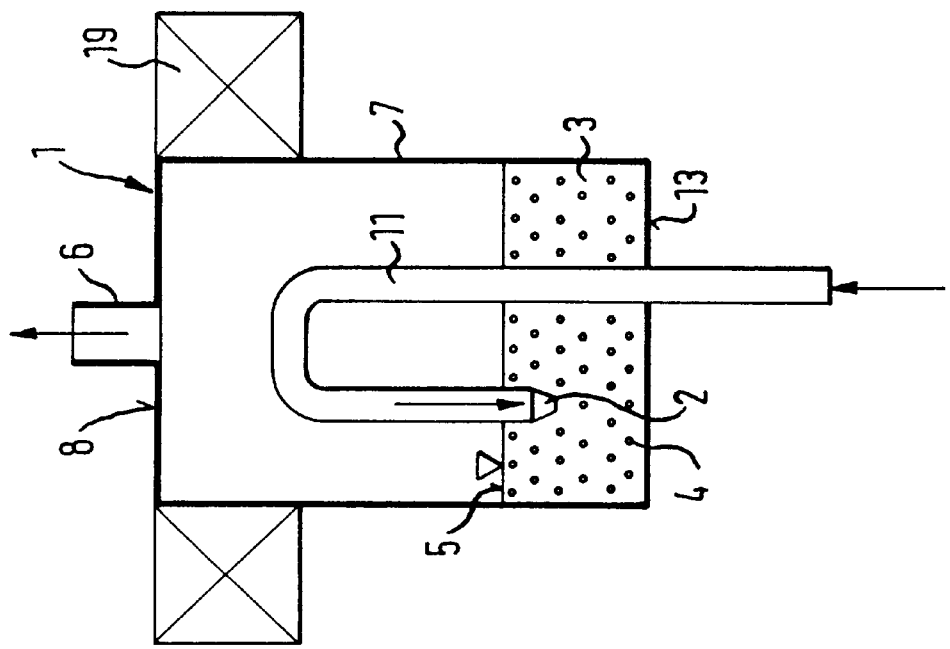

GAS FLOW VALVE

TECHNICAL FIELD

The invention relates to a gas flow valve.

BACKGROUND OF THE INVENTION

Conventional gas flow valves hitherto comprise one or more shutoff bodies between the gas inlet and the gas outlet which, depending on their position, permit a gas flow through the valve or interrupt the flow path. These moving shutoff bodies need to have a correspondingly close tolerance so that no leakage currents occur in the shutoff position of the valve. Conventional gas flow valves as usual hitherto are usually complicated to manufacture.

BRIEF SUMMARY OF THE INVENTION

The invention provides a gas flow valve of simple configuration. The gas flow valve according to the invention comprises at least one gas inlet, at least one gas outlet, flow path between said gas inlet and said gas outlet, a magnetic fluid in the valve arranged in the flow path and means for application of a magnetic field to the magnetic fluid. The magnetic fluid solidifies upon application of the magnetic field, interrupts the flow path from at least one gas inlet to at least one gas outlet gas-tight and permits gas flow when no magnetic field is applied.

Instead of operating with a moving sliding body or a separate shutoff body the gas flow valve in accordance with the invention operates with a magnetic fluid and has thus a very simple and rugged configuration subjected to no wear.

Magnetic fluids are stable dispersed systems containing modified magnetic particles a few nanometers in size as a dispersed phase. The dispersion medium used may be, for example, water, hydrocarbons or also vacuum and dispersion oils. By specifically altering the chemical composition a, variety of magnetic fluids can be produced, each of which can be optimized for the application in each case.

Hitherto, magnetic fluids have been used, for example, for magnetohydrostatic separation in which use is made of the buoyancy of non-metals in the magnetic fluid magnetically determined and dependent on the density and magnetic field gradient for the separation of non-metals. In addition, magnetic fluids are also used for sealing, mounting, damping and relieving the loads on shafts. In automotive engineering magnetic fluids serve, among other things, for adjusting the various damping requirements in vehicle suspension since differing degrees of hardness can be generated by magnetic fields differing in strength, resulting in differing viscosities of the magnetic fluid.

The present invention employs, however, the magnetic fluid for switching a gas valve by utilizing the change in viscosity of the magnetic fluid due to application of a magnetic field. When no magnetic field or merely a weak magnetic field is applied the magnetic fluid remains fluid and homogenous. In this condition, a gas can flow from the gas inlet through the fluid to the gas outlet, whereas by applying a sufficiently strong magnetic field the magnetic fluid changes from the fluid state to the solid state in which the gas is shut off by the solidified magnetic fluid. In addition, the magnetic fluid is attracted by the magnetic field, i.e. a shiftable magnet may be specifically put to use to shut off or open individual inlets or outlets. It is furthermore conceivable to apply a magnetic field of only medium strength by which the magnetic fluid does not totally shut off the gas flow, i.e. permitting a partial gas flow so that the gas volume flowing through the valve in accordance with the invention can be continuously adjusted.

Two different basic principles are possible for opening a gas inlet and/or gas outlet. According to the first principle it is provided for that the fluid level is adapted to the gas inlet and gas outlet so that when the gas inlet and gas outlet are open the gas flows through the fluid. According to the second principle the gas does not flow through the fluid when the valve is open. For this purpose it is provided for that for opening at least one gas inlet and/or one gas outlet the magnetic field acts on the magnetic fluid in such a direction and strength that the latter is displaced into the region of the gas inlet and/or gas outlet so that gas is able to flow directly from the gas inlet to the gas outlet without passing through the fluid. In this arrangement the magnetic field attracts or repels the fluid, the magnetic fluid being shifted so that the fluid surface is not horizontal but inclined.

The valve in accordance with the invention may be e.g. a 2/2-way valve. One embodiment of the invention provides for a pressure vessel between the gas inlet and the gas outlet which is filled at least in part by the magnetic fluid into which an inlet tube protrudes, a part of the inlet tube extending beyond the fluid level. This part of the inlet tube extending beyond the fluid level prevents fluid from flowing out of the pressure vessel via the inlet tube carrying the gas.

The inlet tube may be configured bow-shaped and protrude into the fluid by its inlet end from above or also additionally extend from below through a base surface area and a section of the pressure vessel filled with fluid up to above the fluid level and from there downwards again into the fluid. In addition, it is possible to guide the inlet tube through an upper side of the pressure vessel into the fluid.

The pressure vessel is preferably cylindrical or cuboidal in shape and may be provided with a rounded under part, the gas outlet in this embodiment being provided on the upper side of the pressure vessel.

The magnetic field can be generated in various ways. In accordance with a first possibility a permanent magnet movable to and from the magnetic fluid may be provided which in accordance with a preferred embodiment surrounds the pressure vessel for example annularly and is shiftable parallel to the shell surface area of the latter from a non-actuated position into an actuated position. In the actuated position the permanent magnet surrounds at least in part the portion of the pressure vessel filled with magnetic fluid.

If the permanent magnet is shiftable at the shell surface area of the pressure vessel, a separate mounting having parallel guides for shifting the permanent magnet can be eliminated.

The second possibility of generating a magnetic field is to provide a switchable electromagnet, this too, surrounding preferably at least in part the portion of the pressure vessel filled with magnetic fluid. Accordingly, in the interior of the spool of the electromagnet, where the magnetic field is particularly strong, the magnetic fluid is also arranged.

In the case of a valve having a rounded lower part the magnet, which may be configured as a permanent magnet and also as an electromagnet, may be arranged arrestable continuously or in several positions to specifically interrupt or admit the gas flow in one or more suitably arranged inlets or outlets.

It has been found to be particularly favorable to add non-magnetic particles such as e.g. particles of plastics, rubber or of diamagnetic or paramagnetic metals such as copper or aluminum to the magnetic fluid which support switching the valve. The non-magnetic particles may, on the one hand, receive in the magnetic fluid a magnetic buoyancy depending on the density and magnetic field gradient and are thus displaced to the top edge of the magnetic fluid and, on the other, particles having no magnetic buoyancy may be provided which are pressed against each other due to the change in viscosity on application of a magnetic field. In any case by providing such non-magnetic particles an accelerated and improved shutoff effect of the valve is attained.

It is furthermore preferably provided for that tensides exist in the magnetic fluid which due to their molecular structure are surface-active and are employed as wetting agents, esters or fatty acids being particularly suitable in this respect.

Using a magnetic fluid for a gas flow valve is not restricted to merely a one-way valve, the invention also defining a 3/2 way and multiway gas flow valve, whereby several of the valves as described above may be connected to each other.

BRIEF DESCRIPTION OF THE DRAWINGS

FIG. 1 is a schematic illustration of a 2/2-way valve in the open condition incorporating an electromagnet in accordance with the invention, FIG. 2 shows the valve of FIG. 1 in the closed condition, FIG. 3 is a schematic illustration of the 2/2-way valve in the open condition incorporating a permanent magnet in accordance with a second embodiment of the invention, FIG. 4 shows the valve of FIG. 3 in the closed condition.

DETAILED DESCRIPTION OF PREFERRED EMBODIMENTS

Figure 5:
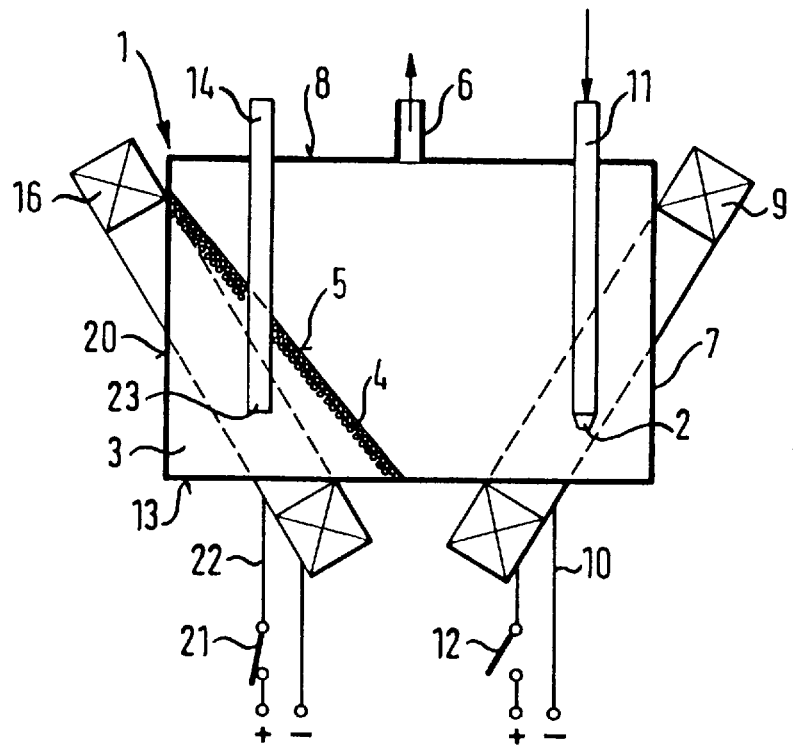
FIG. 5 is a schematic illustration of a 3/2-way valve in the open condition incorporating two electromagnets in accordance with the invention.

FIGS. 1 to 4 show a gas flow valve 1 configured as a 2/2-way valve.

In accordance with a first embodiment shown in FIGS. 1 and 2 a cylindrical pressure vessel 7 is provided which is partly filled with a magnetic fluid 3. Outside of the pressure vessel 7 an electromagnet 9 in the form of a spool surrounds the part of the pressure vessel 7 filled with fluid. The electromagnet 9 is connected to a voltage source via leads 10, making and breaking the connection of which depends on the position of a switch 12. The cylindrical shape of the pressure vessel enables the valve 1 as well as its electromagnet 9 annularly surrounding the pressure vessel 7 and adjoining the latter to be simply fabricated.

The inlet tube 11 extends through an opening in the shell surface area of the pressure vessel 7 into the magnetic fluid 3 and further bow-shaped above the fluid level 5 before finally protruding into the fluid 3 from above by its gas inlet 2. Due to part of the inlet tube 11 extending above the fluid level 5 no magnetic fluid 3 is able to flow from the pressure vessel 7 via the inlet tube 11. A gas outlet 6 is located on the upper side 8 of the pressure vessel 7.

The functioning of the valve 1 will now be explained with respect to the FIGS. 1 and 2. In FIG. 1 the switch 12 is shown in the open condition, i.e. the electromagnet 9 is not connected to the voltage source and no magnetic field is generated. In this condition the magnetic fluid 3 is in the liquid phase, non-magnetic particles 4 being utmost finely dispersed in the magnetic fluid 3. Water is employed as the dispersion medium for the magnetic particles present in the magnetic fluid 3. Since the magnetic fluid 3, as shown in FIG. 1, is present in its liquid phase gas is able to flow via the inlet tube 11 and the gas inlet 2 through the fluid 3. The portion of the interior of the pressure vessel 7 not filled with fluid 3 is filled with gas which is able to flow via the gas outlet 6 to a consumer.

If the valve 1 is to be closed, the switch 12, as shown in FIG. 2, must also be closed so that the electromagnet 9 creates a magnetic field which acts on the magnetic fluid 3. The magnetic field is thereby so strong that a change in viscosity of the magnetic fluid 3 and a phase transition from fluid to solid takes place. The non-magnetic particles present in the magnetic fluid 3, preferably in the form of elastomers, are selected such that they receive a magnetic buoyancy in this state in the fluid 3 and are forced to the fluid level 5 where they are pressed together to form an additional barrier layer. The solidified magnetic fluid 3 permits no flow of gas and totally interrupts the gas flow.

The further embodiment shown in the FIGS. 3 and 4 substantially corresponds to the embodiment explained heretofor except that instead of the electromagnet 9 a permanent magnet 19 is provided arranged vertically shiftable on the shell surface area of the pressure vessel 7 so that the shell surface area represents the mounting for the permanent magnet 19. Contrary to the embodiment described above the inlet tube 11 extends from below through a base surface area 13 of the pressure vessel 7 into the interior of the latter.

In the open position of the valve 1 as shown in FIG. 3 the permanent magnet 19 is arranged in the upper portion of the pressure vessel 7. In this arrangement the magnetic field generated by the latter is so far removed from the magnetic fluid 3 that it is too weak to translate the fluid 3 present in the liquid phase as shown in FIG. 3 into the solid phase or to attract it into portions having a stronger magnetic field.

When, however, the permanent magnet 19, as shown in FIG. 4, is shifted downwards so that it surrounds the part of the pressure vessel 7 filled with fluid 3, the actions in the fluid 3 as explained in conjunction with FIG. 2 occur and the valve 1 assumes its closed position. The tensides also present in the fluid 3 are surface-active and prevent a kind of agglomeration of non-magnetic particles.

It is also possible to configure valves 1 to incorporate both electromagnets 9 and permanent magnets 19.

Figure 6:
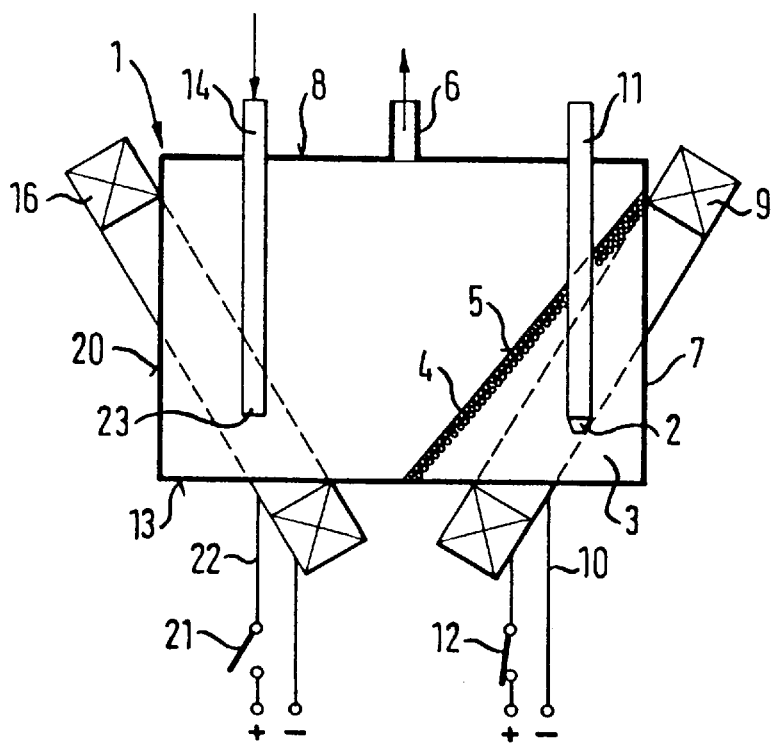
FIG. 6 shows the valve of FIG. 5 in the closed condition.

FIGS. 5 and 6 show a gas flow valve 1 configured as a 3/2-way valve.

In accordance with this embodiment a cylindrical pressure vessel 7 is provided which is partly filled with a magnetic fluid 3. Protruding from above through openings in the upper side 8 of the pressure vessel 7 into this magnetic fluid 3 is a vent tube 14 and an inlet tube 11 having a gas inlet 2, a gas outlet 6 being located on the upper side 8 of the pressure vessel 7.

Outside of the pressure vessel 7 two electromagnets 9, 16 in the form of spools are arranged such that one surrounds the region of the gas inlet 2, the other the region of the gas inlet 23. The electromagnets 9 and 16 are connected via leads 10 and 22 respectively to the voltage sources (not shown), the circuits being closed or interrupted depending on the position of the switches 12, 21. Two of the possible four switching positions of the switches 12, 21 are made use of to achieve the 3/2-way valve, namely the switching position switch 12 open, switch 21 closed (FIG. 5) and the switching position switch 12 closed, switch 21 open (FIG. 6).

The functioning of the 3/2-way valve will now be explained with respect to the FIGS. 5 and 6. In FIG. 5 the circuit of the electromagnet 16 is closed, i.e. electromagnet 16 generates a magnetic field which attracts the magnetic fluid 3 into the region of the gas inlet 23 where it translates from the liquid phase into the solid phase. In this case too, the non-magnetic particles 4 dispersed in the liquid phase, as shown in FIG. 2, are displaced by the magnetic field outwards, i.e. to the fluid surface represented by the inclined fluid level 5, where they form an additional barrier layer. The solidified magnetic fluid 3 allows no flow of gas and totally seals off the vent tube 14. Between inlet tube 11 and gas outlet 6 the gas is able to flow unobstructed, valve 1 being open.

In the position shown in FIG. 6 the circuit of the electromagnet 9 is closed via the switch 12, whereas the circuit of the electromagnet 16 is broken by the switch 21. The electromagnet 9 generates a magnetic field which attracts the magnetic fluid 3 into the region of the gas inlet 2 so that the fluid there translates from the liquid phase into the solid phase. Here too, the same as in the switching position shown in FIG. 5, the barrier layer consists of non-magnetic particles 3. The gas inflow through the inlet tube 11 is totally interrupted, valve 1 is closed. Between gas outlet 6 and vent tube 14 gas is able to flow via the pressure vessel 7, however, i.e. valve 1 is vented.

The embodiment shown in FIGS. 7 to 10 corresponds substantially to the embodiment explained by way of FIGS. 5 and 6, here however, instead of the vent tube 14 a second inlet tube 15 protrudes from above into the magnetic fluid 3.

The two inlet tubes 11, 15 may be closed or opened or switched in common by a corresponding assigned magnetic field. The result is a valve 1 having a mixing function.

Figure 7:
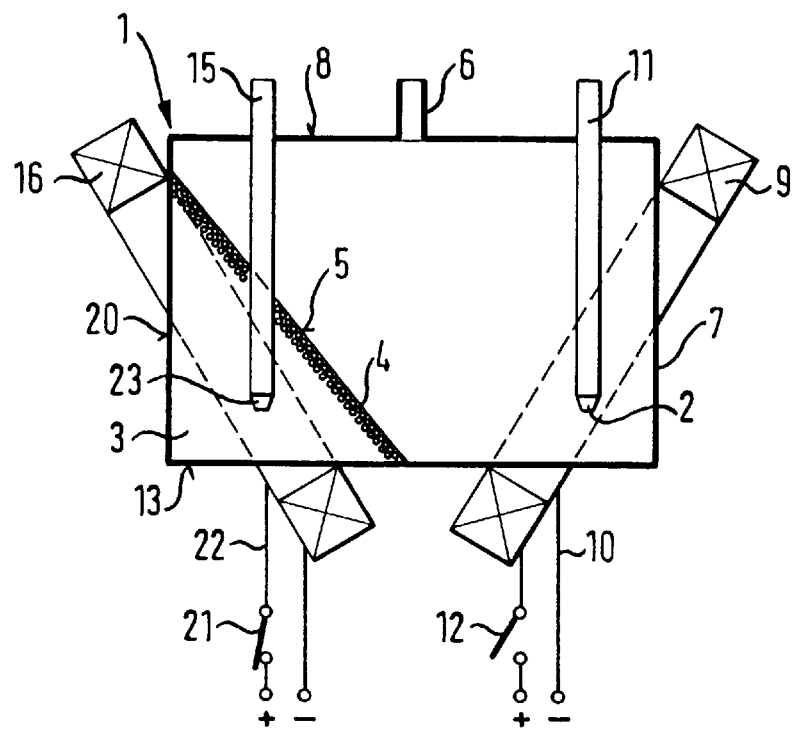
FIG. 7 is a schematic illustration of a valve incorporating two electromagnets in accordance with the invention, with a mixing function in the switching position 1st gas inlet is open, 2nd gas inlet is closed.

In accordance with FIG. 7 the inlet tube 15 is closed by the effect of the magnetic field of the electromagnet 16. Between the inlet tube 11 and the gas outlet 6 gas is able to flow unobstructed.

Figure 8:
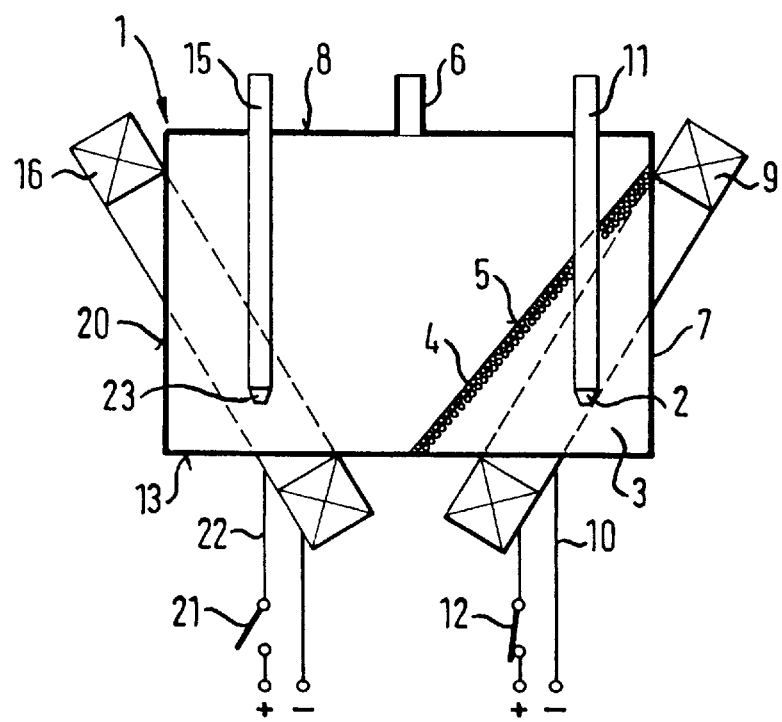
FIG. 8 shows the valve of FIG. 6 in the inverse switching position 1st gas inlet is closed, 2nd gas inlet is open.

FIG. 8 shows the inverse function. In this case the inlet tube 11 is closed by the effect of the magnetic field of the electromagnet 9 and gas is able to flow unobstructed between inlet tube 15 and gas outlet 6.

Figure 9:
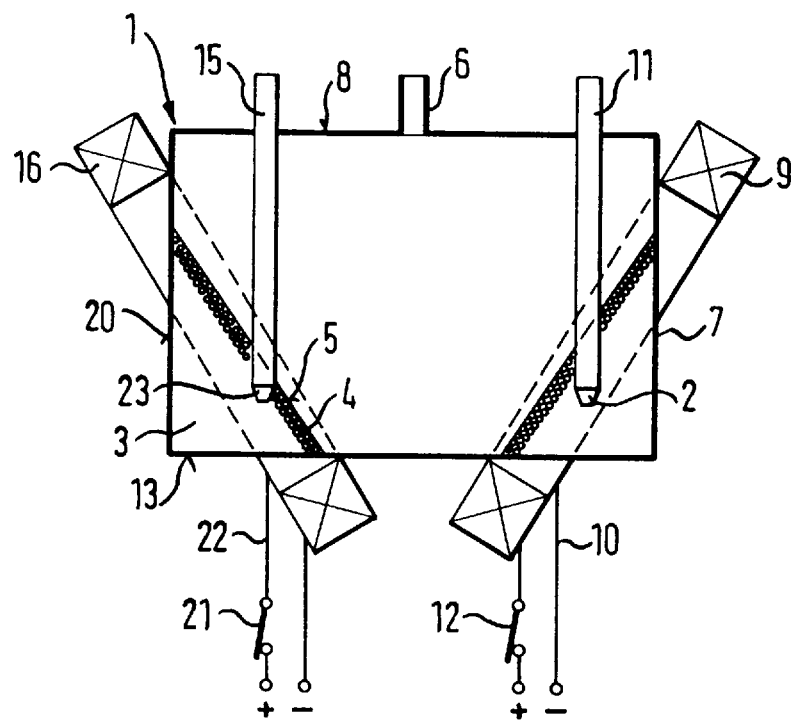
FIG. 9 shows the valve of FIGS. 7 and 8 in the switching position closed.

In FIG. 9 the circuits of both electromagnets 9, 16 are closed. Due to the effect of the magnetic fields the magnetic fluid 3 is attracted in each case to the inlet tubes 11 and 15 sealing off the gas inlets 2 and 23 totally due to the actions in the magnetic fluid 3 as already described, valve 1 being closed. Part of the fluid 3 is displaced to the left-hand side of the pressure vessel 7 to close the gas inlet 23 by an inclined gas-tight fluid surface 5. The remaining other part of the fluid 3 is displaced to the right-hand side of the pressure vessel 7 where it closes off the gas inlet 2 by an inclined gas-tight fluid surface.

Figure 10:
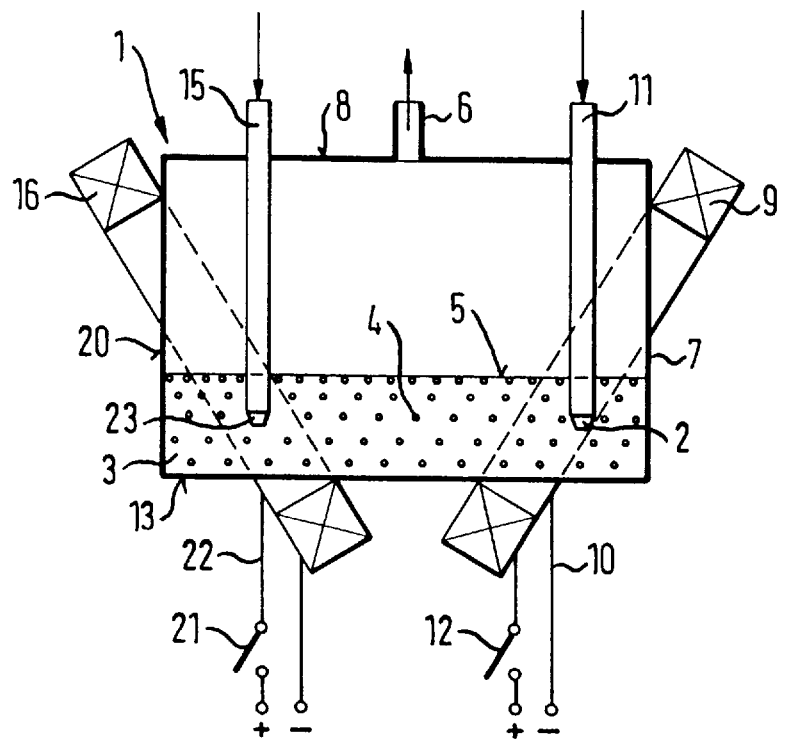
FIG. 10 shows the valve of FIGS. 7 to 9 in the switching position open.

In FIG. 10 the switches 12 and 21 are open, i.e. the electromagnets 9 and 16 generate no magnetic fields. The magnetic fluid 3 is present in the liquid phase and allows gases to flow from both gas inlets 2, 23 to the gas outlet 6.

FIGS. 11 to 14 show an embodiment which substantially corresponds to the embodiment illustrated in FIGS. 7 to 10. Due to the change in the arrangement a valve 1 having a distribution function materializes. In this case the inlet tube 11 is arranged between two outlet tubes 17, 18 so that should no magnetic field be applied the gas inlet 2 and ends 24 and 25 of the outlet tubes 17 and 18 respectively protrude into the magnetic fluid 3.

Figure 11:
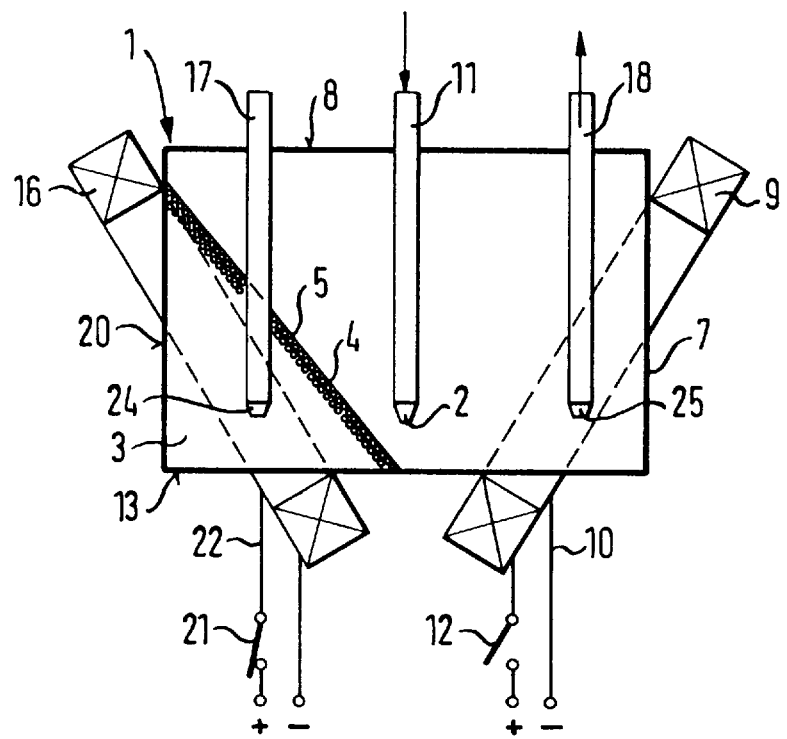
FIG. 11 is a schematic illustration of a valve incorporating two electromagnets in accordance with a further embodiment of the invention, with a distributing function in the switching position 1st gas outlet is open, 2nd gas outlet is closed.

In FIG. 11 closing the switch 21 closes the circuit of the electromagnet 16, whereas the circuit of the electromagnet 9 is open. The electromagnet 16 generates a magnetic field in the region of the end 24. Due to the effect of the magnetic field the magnetic fluid 3 is attracted into this region where it solidifies. The aforementioned inner actions seal off the gas outlet 17 totally, whereas gas from the inlet tube 11 is able to flow via the outlet tube 18 from the pressure vessel 7 without needing to flow through magnetic fluid.

Figure 12:
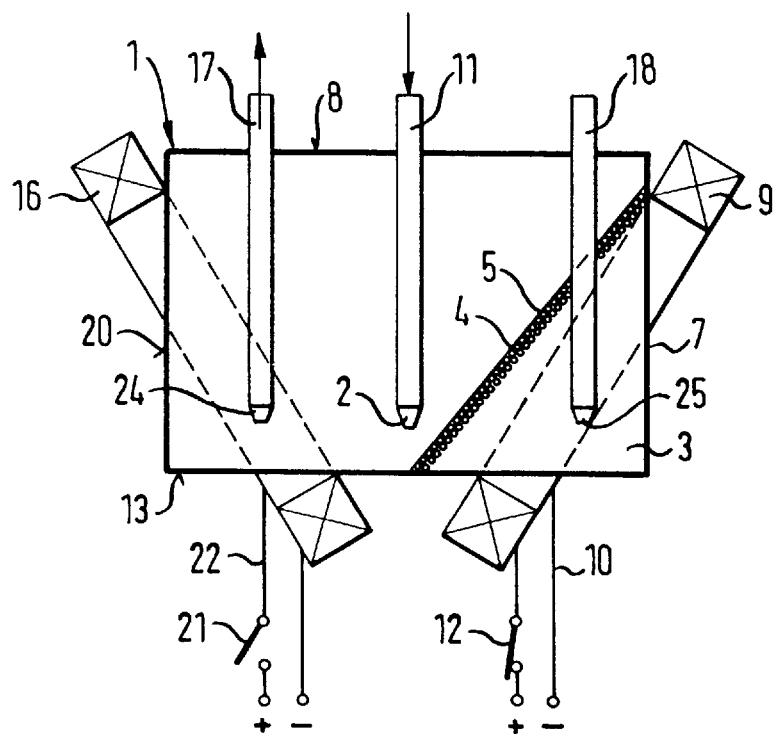
FIG. 12 shows the valve of FIG. 11 in the switching position 1st gas outlet is closed, 2nd gas outlet is open.

FIG. 12 shows the inverse function of valve 1. In this case the outlet tube 18 is shut off by the magnetic field generated by the electromagnet 9. From the inlet tube 11 gas is able to flow via the outlet tube 17 from the pressure vessel 7.

Figure 13:
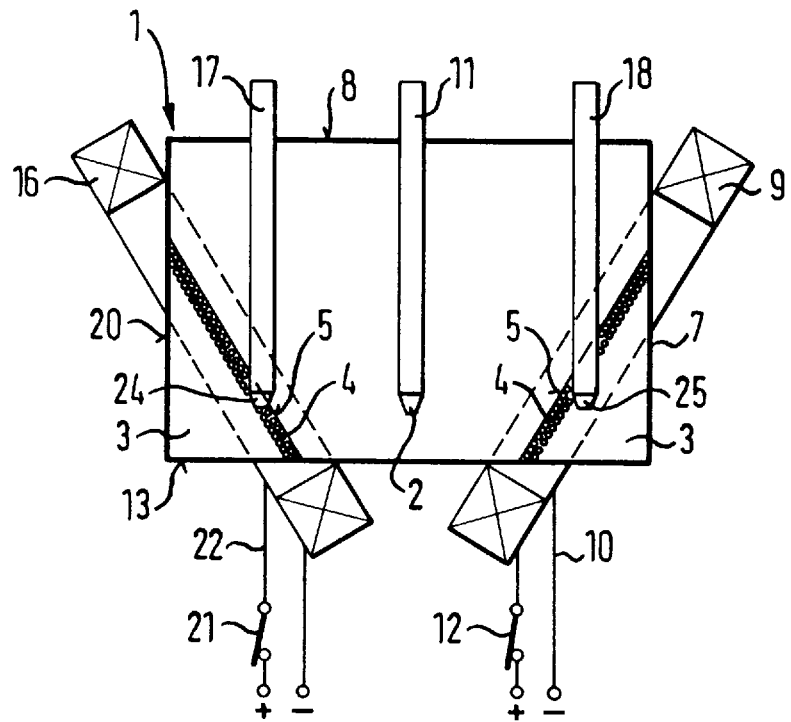
FIG. 13 shows the valve of FIGS. 11 and 12 in the switching position closed.

In FIG. 13 the switches 12 and 21 are closed. The electromagnets 9 and 16 generate magnetic fields which attract the magnetic fluid 3 into the regions of the ends 24 and 25, the fluid translating into the solid phase. The two outlet tubes 17 and 18 are totally shut off by the inner actions in the magnetic fluid as already described, valve 1 being in the blocking function.

Figure 14:
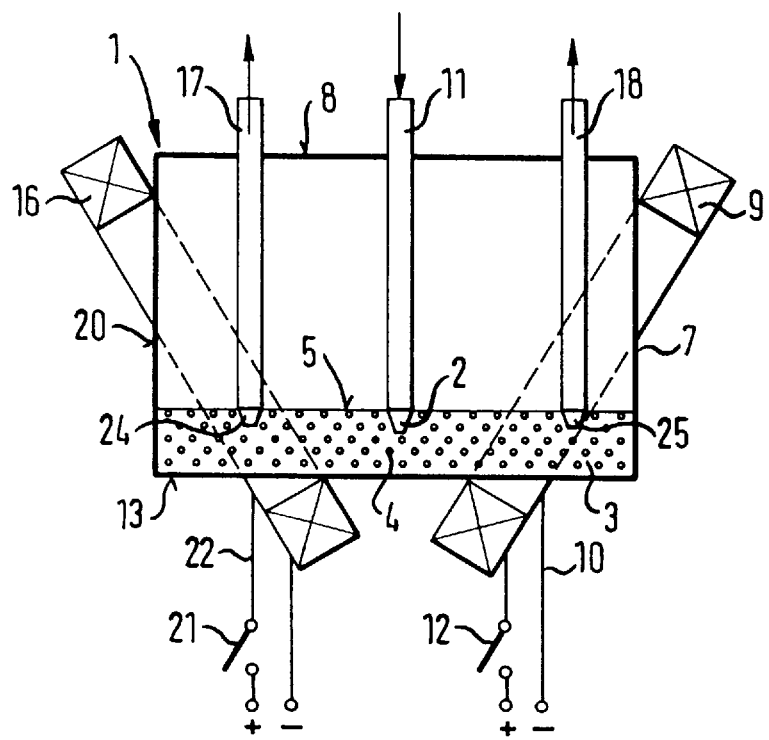
FIG. 14 shows the valve of FIGS. 11 to 13 in the switching position open.

In FIG. 14 the circuits of the electromagnets 9 and 16 are open so that no magnetic field effects the magnetic fluid 3. As described in FIG. 1 gas is able to flow from the inlet tube 11 through the fluid 3 and outlet tubes 17, 18. In this case the gas is distributed to the two outlet tubes 17 and 18.

Figure 15A:
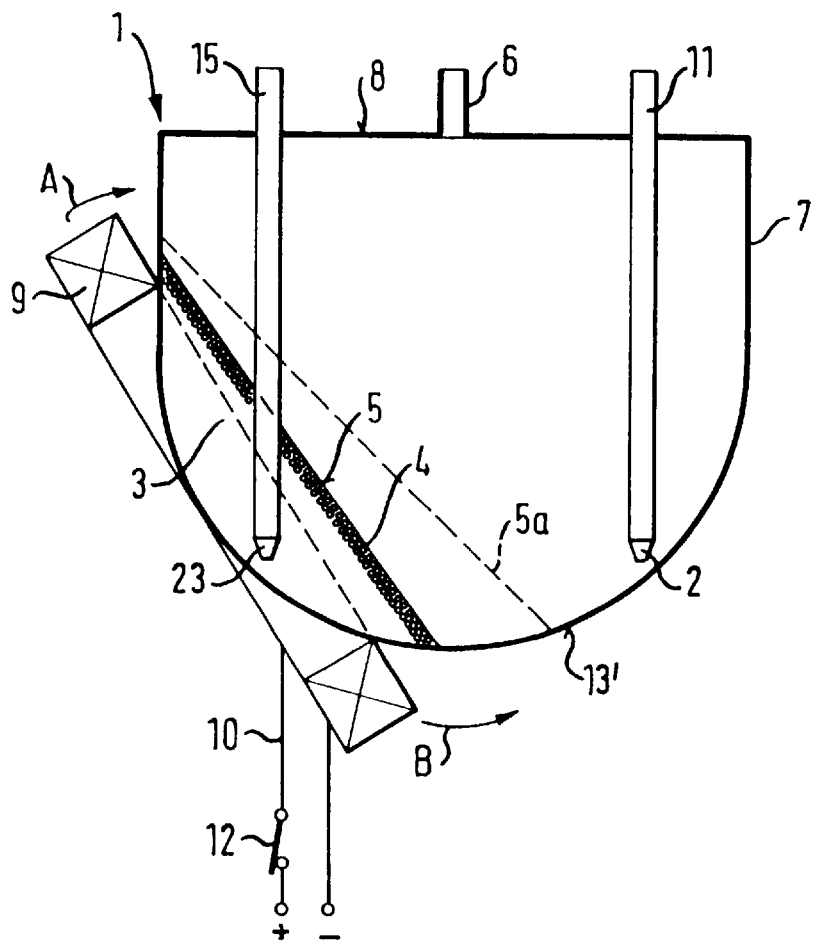
FIG. 15 is a schematic illustration of a multiway valve incorporating an electromagnet in accordance with an additional embodiment of the invention in the partly closed condition as a side view and plan view.
Figure 15B:
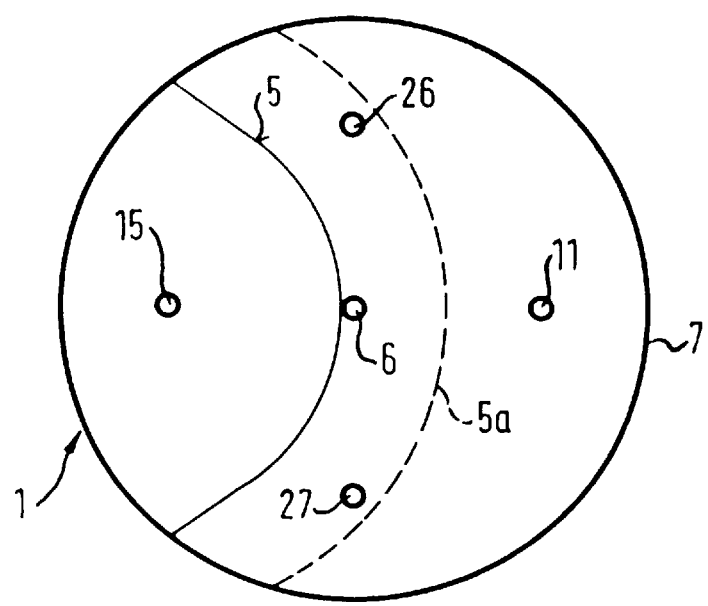
Figure 16A:
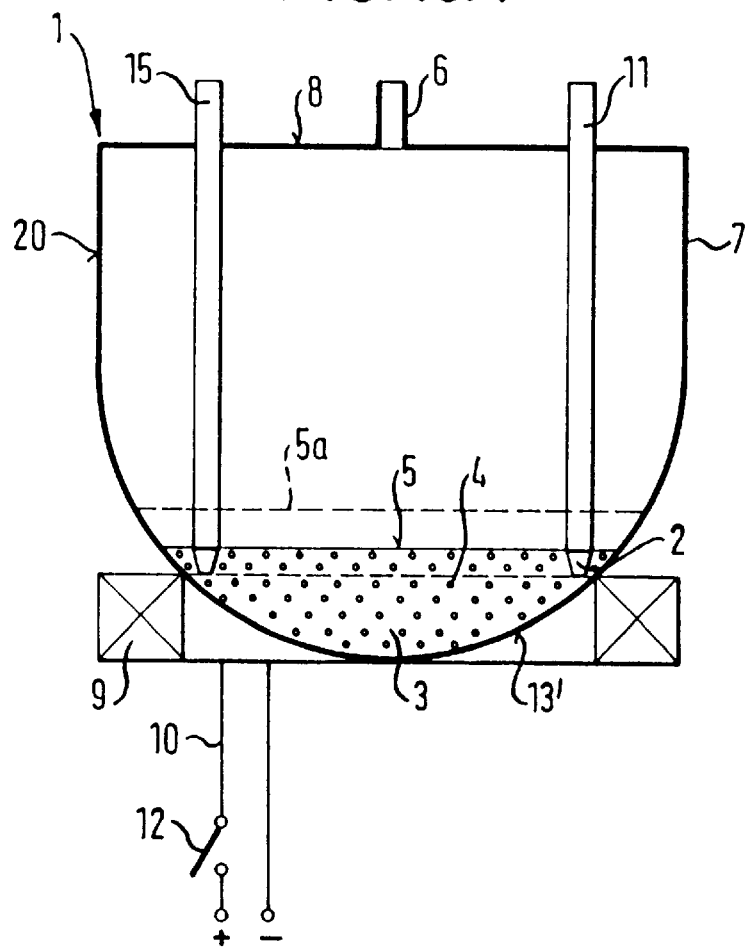
FIG. 16 is a side view and plan view of the valve shown in FIG. 15 in the state with all gas inlets open.
Figure 16B:
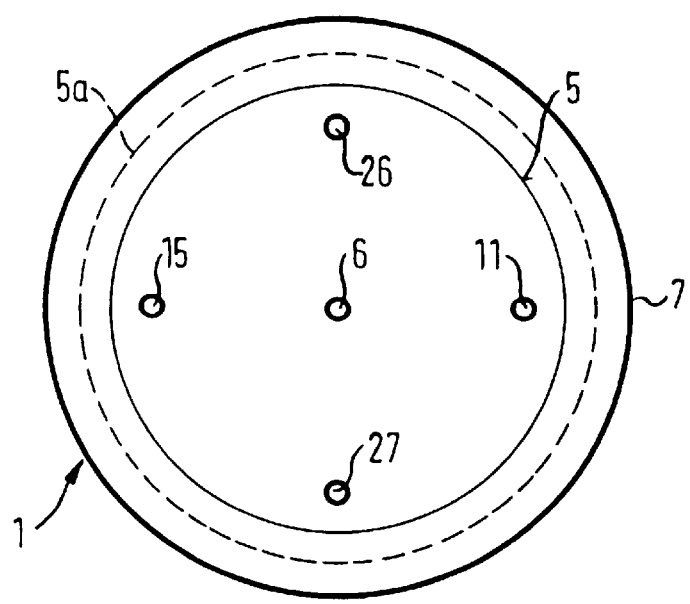

FIGS. 15 and 16 show a further embodiment of a valve 1 configured as a multiway valve having a mixing function comprising four inlet tubes 11, 15, 26 and 27 and a gas outlet 6. The way in which the valve 1 works corresponds substantially to that as already explained with respect to FIGS. 7 to 10. Shutting off or opening individual inlet tubes 11, 15, 26, 27 is done by means of the electromagnet 9 being horizontally rotatable at a hemispherical lower part 13' of the valve 1 about the vertical longitudinal axis of the pressure vessel 7 (cf arrow A) and/or being shiftably mounted about the lower end of the hemispherical lower part 13' oscillatingly (cf arrow B). The corresponding guidance of the electromagnet 9 is not shown. The electromagnet 9 can be arrested in several positions or even continuously so. Instead of the electromagnet 9 a permanent magnet may also be provided.

In accordance with FIG. 15 the annular electromagnet 9 is shiftably mounted by a guiding means (not shown) such that its magnetic field attains only the region of the gas inlet 2. Due to the effect of the magnetic field the solidified magnetic fluid 3 shuts off the inlet tube 15. If the fluid level 5 is brought to the fluid level 5a by replenishing the fluid 3 via a filler tube (not shown) further inlet tubes are shut off, these being in the example inlet tubes 26 and 27, depending on the fluid level 5a, the magnetic fluid 3 and the position of the electromagnet 9.

In the position shown in FIG. 16 the electromagnet 9 extends around the lower part 13' of the valve 1. In this horizontal basic setting all lower tube ends of the inlet tubes 11, 15, 26 and 27 lie in the region of its magnetic field. The switch 12 of the circuit is opened and no magnetic field acts on the magnetic fluid 3. As described above, in this case gas is able to flow from the inlet tubes 11, 15, 26 and 27 through the magnetic fluid 3 and through the gas outlet 6 from the pressure vessel 7 since valve 1 is totally opened. When, however, the switch 12 in this basic setting of the electromagnet 9 is closed, the magnetic fluid 3 solidifies due to the effect of the magnetic field of the electromagnet 9 as already described and seals off all inlet tubes 11, 15, 26 and 27 so that valve 1 is totally shut off.

Figure 17A:
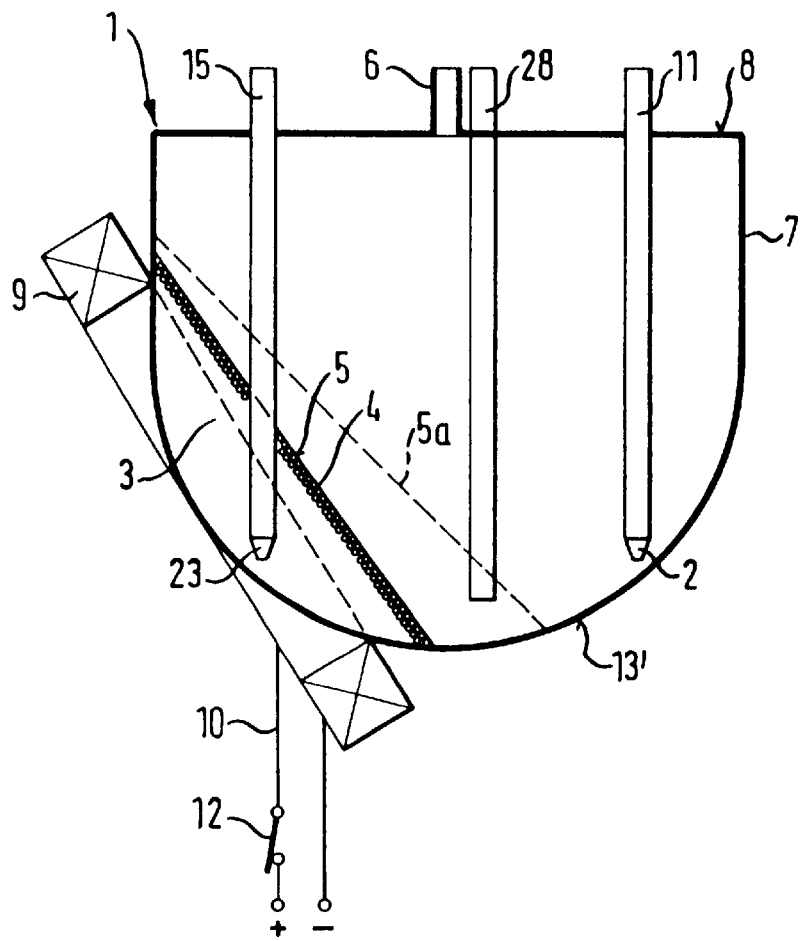
FIG. 17 is a schematic illustration of a multiway valve incorporating an electromagnet with a filler tube via which the fluid level of the magnetic fluid can be regulated in accordance with the invention in the partly closed condition as a side view and plan view.
Figure 17B:
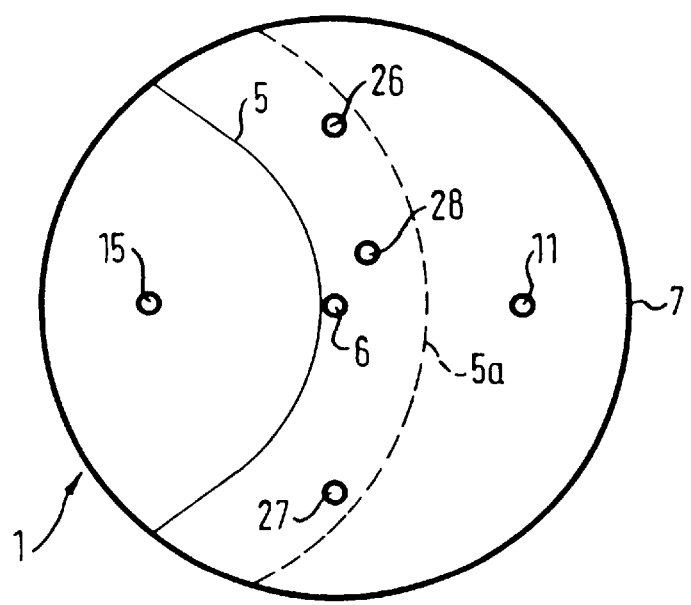
Figure 18A:
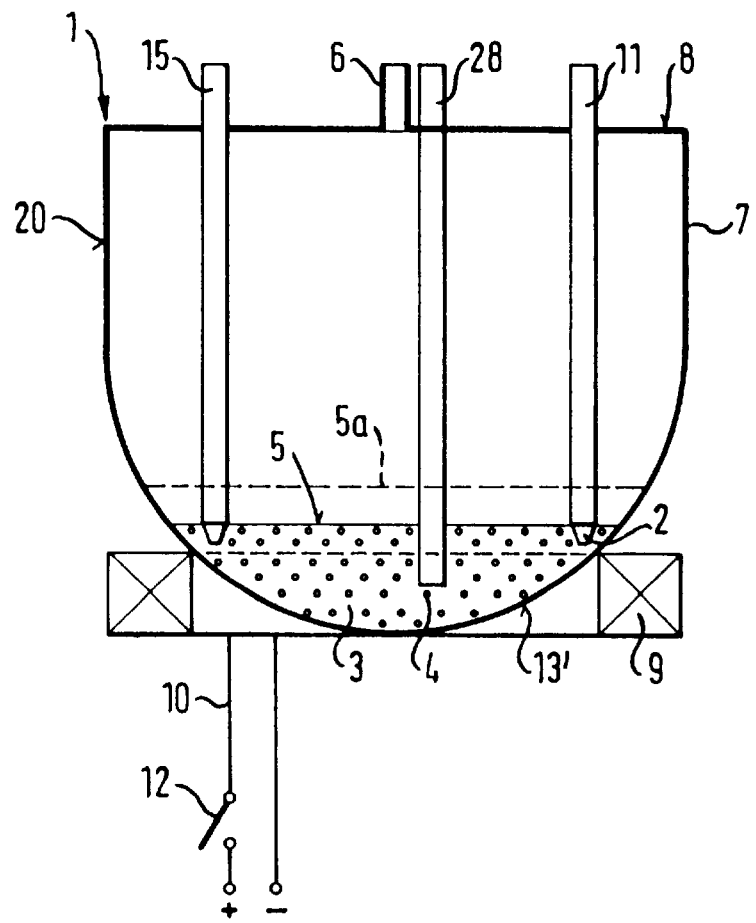
FIG. 18 is a side view and plan view of the valve shown in FIG. 17 in the state with all gas inlets open.
Figure 18B:
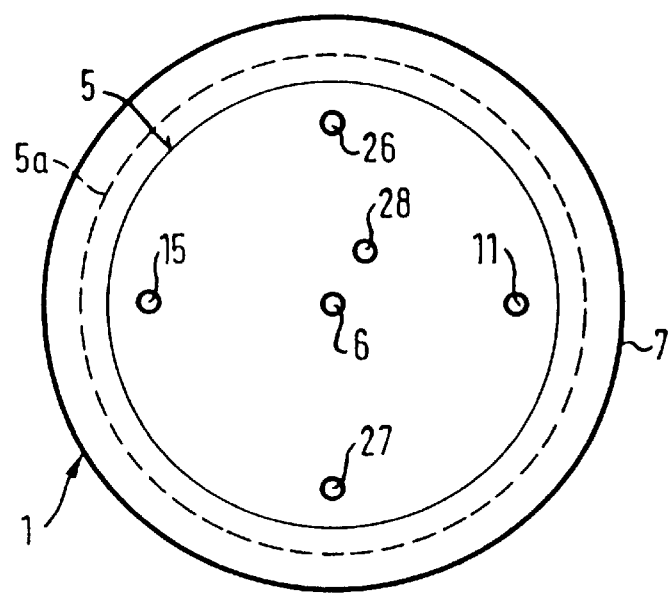

FIGS. 17 and 18 show the gas flow valve 1 as has already been explained with respect to FIGS. 15 and 16. To change the fluid level 5 a gas-sealable filler tube 28 is introduced from above through the upper side 8 of the pressure vessel 7 sufficiently downwards so that it protrudes into the magnetic fluid 3 in the horizontal basic setting of the magnet 9. The filler tube 28 is connected to a pumping system (not shown) and permits a continuous change in function of the valve 1. Depending on the position of the electromagnet 9 and the filling level 5, one, two or three inlet tubes are thus sealed off.

It is also possible to configure valves incorporating both electromagnets 9 and additional permanent magnets 19.

The multiway valves as described above are characterized by a single pressure vessel being sufficient since the magnetic fluid is drawn into a strong magnetic field so that predetermined inlet or outlet tubes can be opened or closed. In addition to this, however, multiway valves may also be produced by several of the valves already described, connected to each other and switched via corresponding drilled passageways.

In addition at the input of each switch 12, 21 a potentiometer may be arranged with which the amperage applied to the electromagnet 9 or 19 can be continuously varied. Varying the amperage in turn varies the viscosity of the magnetic fluid 3 so that this too is continuously variable to allow more or less gas to flow through the valve 1, thus achieving a continuously adjustable valve.

I claim:

1. A gas flow valve, comprising at least one gas inlet, at least one gas outlet, a flow path between said gas inlet and said gas outlet, a magnetic fluid in the valve arranged in said flow path and means for application of a magnetic field to said magnetic fluid, said magnetic fluid solidifying upon application of said magnetic field, interrupting said flow path from said at least one gas inlet to said at least one gas outlet and permitting gas flow when no magnetic field is applied, said magnetic fluid containing non-magnetic particles for forming a further barrier layer to the flow of gas through said valve.

2. The valve according to claim 1, wherein more than one gas outlet is provided and wherein said magnetic fluid interrupts said flow path to at least one of said gas outlets.

3. The valve as set forth in claim 1, wherein the fluid level of said magnetic fluid is adapted to said gas inlet and said gas outlet so that when said gas inlet and said gas outlet are open the gas flows through said fluid.

4. The valve as set forth in claim 1, wherein for opening at least one of said inlet and outlet the magnetic field acts on the magnetic fluid in such a direction and strength that the latter is displaced to an extent so that gas is able to flow directly from said gas inlet to said gas outlet without passing through said fluid.

5. The valve as set forth in claim 1, wherein said valve is a 2/2-way valve.

6. The valve as set forth in claim 1, wherein said valve is a multiway valve.

7. The valve as set forth in claim 1, wherein a pressure vessel between said gas inlet and said gas outlet, which is filled at least in part by said magnetic fluid, and at least one inlet tube are provided, the latter protruding into said magnetic fluid, part of said inlet tube extending above said fluid level.

8. The valve as set forth in claim 7, wherein said inlet tube is configured bow-shaped and has an inlet end by which it protrudes into said magnetic fluid from above.

9. The valve as set forth in claim 8, wherein a base surface area is provided and said pressure vessel has a section which is filled with magnetic fluid, said inlet tube extending from below through said base surface area and said section of said pressure vessel up to above said fluid level and from there downwards again into said magnetic fluid.

10. The valve as set forth in claim 8, wherein said pressure vessel has an upper side through which said at least one inlet tube extends from above and into said magnetic fluid.

11. The valve as set forth in claim 7, wherein said pressure vessel is cylindrical or cuboidal in shape.

12. The valve as set forth in claim 7, wherein said pressure vessel has a lower part which is rounded.

13. The valve as set forth in claim 7, wherein said pressure vessel has an upper side and said gas outlet is provided on said upper side.

14. The valve as set forth in claim 13, wherein said gas outlet comprises at least one outlet tube having an end protruding from above into said magnetic fluid.

15. The valve as set forth in claim 1, wherein a vent tube is provided extending from above into said magnetic fluid.

16. The valve as set forth in claim 1, wherein a permanent magnet movable to and from said magnetic fluid is provided for applying said magnetic field.

17. The valve as set forth in claim 16, including a pressure vessel between said gas inlet and said gas outlet which is filled at least in part by said magnetic fluid and wherein said permanent magnet annularly surrounds said pressure vessel having a shell surface and is shiftable parallel to said shell surface from a non-actuated position into an actuated position in which said permanent magnet surrounds at least in part said part of said pressure vessel filled with said magnetic fluid.

18. The valve as set forth in claim 17, wherein said permanent magnet is shiftable on said shell surface of said pressure vessel.

19. The valve as set forth in claim 1, wherein several permanent magnets are arranged opposite each other so that their magnetic field acts in each case on said magnetic fluid in the region of at least one of said inlet and said outlet.

20. The valve as set forth in claim 19, wherein said permanent magnets are movable on a guide to and from a pressure vessel between said gas inlet and said gas outlet.

21. The valve as set forth in claim 1, wherein at least one switchable electromagnet is provided.

22. The valve as set forth in claim 21, including a pressure vessel between said gas inlet and said gas outlet which is filled at least in part by said magnetic fluid, and wherein said electromagnet surrounds at least in part said part of said pressure vessel filled with magnetic fluid.

23. The valve as set forth in claim 22, wherein said vessel has a lower, rounded part and said electromagnet is shiftable on said lower part of said pressure vessel.

24. The valve as set forth in claim 21, wherein several electromagnets are arranged opposite each other so that their magnetic field acts in each case in the region of at least one of said inlet and outlet.

25. The valve as set forth in claim 21, wherein said electromagnets are switched separately or in common.

26. The valve as set forth in claim 21, wherein by applying a continuously variable amperage to said at least one electromagnet the viscosity of said magnetic fluid can be continuously varied so that depending on the viscosity of said magnetic fluid more or less gas flows, as a result of which said valve is continuously adjustable.

27. The valve as set forth in claim 7, wherein said fluid level within said pressure vessel can be varied.

28. The valve as set forth in claim 27, wherein an inlet tube protruding from above into said fluid and sealable against gas flow is provided via which said fluid level can be varied at will.

29. The valve as set forth in claim 1, wherein as nonmagnetic particles elastomers are present in said magnetic fluid.

30. The valve as set forth in claim 1, wherein paramagnetic and diamagnetic metal particles are present in said magnetic fluid.

31. The valve as set forth in claim 1, wherein tensides are present in said magnetic fluid.

32. The multiway gas flow valve wherein said multiway valve is formed by several switchable gas flow valves as set forth in one of the claim 1 to 31, said flow valves being connected correspondingly to each other.

33. A gas flow valve, comprising at least one gas inlet, at least one gas outlet, a flow path between said gas inlet and said gas outlet, a magnetic fluid in the valve arranged in said flow path and means for application of a magnetic field to said magnetic fluid, said magnetic fluid solidifying upon application of said magnetic field, interrupting said flow path from said at least one gas inlet to said at least one gas outlet and permitting gas flow when no magnetic field is applied, said magnetic fluid containing paramagnetic and diamagnetic metal particles for forming a further barrier layer to the flow of gas through the valve.

34. The valve as set forth in claim 33, wherein said magnetic fluid contains tensides.

35. A gas flow valve, comprising at least one gas inlet, at least one gas outlet, a flow path between said gas inlet and said gas outlet, a magnetic fluid in the valve arranged in said flow path and means for application of a magnetic field to said magnetic fluid, said magnetic fluid solidifying upon application of said magnetic field, interrupting said flow path from said at least one gas inlet to said at least one gas outlet and permitting gas flow when no magnetic field is applied, said magnetic fluid containing tensides therein.

* * * * *